United States Patent
Yang et al.

(10) Patent No.: US 11,777,954 B2
(45) Date of Patent: *Oct. 3, 2023

(54) LOCATION-SPOOFING DETECTION SYSTEM FOR A NETWORK SERVICE

(71) Applicant: Uber Technologies, Inc., San Francisco, CA (US)

(72) Inventors: Sheng Yang, Fremont, CA (US); Ze Huang, Santa Clara, CA (US); Qiao Wang, Palo Alto, CA (US); David Spenser DyTang, San Francisco, CA (US); Kiarash Amiri, San Francisco, CA (US); Tara Michelle Mitchell, San Francisco, CA (US); Xiao Cai, Burlingame, CA (US)

(73) Assignee: Uber Technologies, Inc., San Francisco, CA (US)

( * ) Notice: Subject to any disclaimer, the term of this patent is extended or adjusted under 35 U.S.C. 154(b) by 67 days.

This patent is subject to a terminal disclaimer.

(21) Appl. No.: 17/204,506

(22) Filed: Mar. 17, 2021

(65) Prior Publication Data

US 2021/0203672 A1  Jul. 1, 2021

Related U.S. Application Data

(63) Continuation of application No. 16/155,382, filed on Oct. 9, 2018, now Pat. No. 10,999,299.

(51) Int. Cl.
*H04L 9/40* (2022.01)
*H04W 12/12* (2021.01)
(Continued)

(52) U.S. Cl.
CPC ...... *H04L 63/1408* (2013.01); *H04L 63/1466* (2013.01); *H04W 12/12* (2013.01); *H04W 12/63* (2021.01); *G01S 19/215* (2013.01)

(58) Field of Classification Search
CPC . H04L 63/1408; H04L 63/1466; H04L 67/52; H04L 67/12; H04W 12/12;
(Continued)

(56) References Cited

U.S. PATENT DOCUMENTS

| | | |
|---|---|---|
| 4,412,175 A | 10/1983 | Maynarez |
| 4,663,744 A | 5/1987 | Russell |

(Continued)

FOREIGN PATENT DOCUMENTS

| | | |
|---|---|---|
| CN | 202443493 | 9/2002 |
| CN | 103426016 | 12/2013 |

(Continued)

OTHER PUBLICATIONS

International Search Report in related PCT/US2015/045325 dated Nov. 25, 2015.

(Continued)

*Primary Examiner* — J. Brant Murphy
(74) *Attorney, Agent, or Firm* — MAHAMEDI IP LAW LLP

(57) ABSTRACT

A computing system can receive location data from computing devices of drivers, each of the computing devices operating a designated application associated with an application service. The system can determine a set of locational attributes of a respective driver and determine whether one or more anomalous locational attributes are present in the set of locational attributes of the respective driver. In response to determining that one or more anomalous locational attributes are present, the system can associate a data set with a driver profile of the respective driver.

16 Claims, 4 Drawing Sheets

(51) Int. Cl.
*H04W 12/63* (2021.01)
*G01S 19/21* (2010.01)

(58) Field of Classification Search
CPC ......... H04W 12/63; H04W 4/02; H04W 4/44; G01S 19/215
See application file for complete search history.

(56) References Cited

U.S. PATENT DOCUMENTS

| | | | |
|---|---|---|---|
| 5,400,348 | A | 3/1995 | Yang |
| 6,828,692 | B2 | 12/2004 | Simon |
| 7,359,773 | B2 | 4/2008 | Simon |
| 7,979,899 | B2 | 7/2011 | Guo |
| 8,082,587 | B2 | 12/2011 | Bolay |
| 8,131,848 | B1 | 3/2012 | Denise |
| 8,205,790 | B2 | 6/2012 | Pennella |
| 8,312,543 | B1 | 11/2012 | Gardner |
| 8,359,225 | B1 | 1/2013 | Seth |
| 8,458,041 | B1 * | 6/2013 | Jakobsson ........ G06Q 20/40145 705/26.1 |
| 8,538,158 | B1 | 9/2013 | Denise |
| 8,555,379 | B1 | 10/2013 | Whitehouse |
| 8,671,449 | B1 | 3/2014 | Nachenberg |
| 9,003,505 | B2 | 4/2015 | Brown |
| 9,037,864 | B1 | 5/2015 | Staddon |
| 9,043,970 | B1 | 6/2015 | Desbons |
| 9,300,676 | B2 | 3/2016 | Madhu |
| 9,424,612 | B1 | 8/2016 | Bright |
| 9,491,155 | B1 | 11/2016 | Johansson |
| 9,552,569 | B1 | 1/2017 | Quan |
| 9,799,067 | B2 | 10/2017 | Hasson |
| 9,824,222 | B1 | 11/2017 | Kaplan |
| 9,967,750 | B1 * | 5/2018 | Fernandez ............. G06N 20/00 |
| 10,243,945 | B1 | 3/2019 | Kruse |
| 10,263,868 | B1 | 4/2019 | Baldi |
| 2002/0011940 | A1 | 1/2002 | Cappel |
| 2002/0196415 | A1 * | 12/2002 | Shiratani ................ G01B 11/25 348/E13.005 |
| 2003/0040944 | A1 | 2/2003 | Hielman |
| 2004/0030932 | A1 | 2/2004 | Juels |
| 2004/0225520 | A1 | 11/2004 | Aoki et al. |
| 2004/0249818 | A1 | 12/2004 | Isaac |
| 2005/0278192 | A1 | 12/2005 | Cantini et al. |
| 2006/0149967 | A1 | 7/2006 | Lee |
| 2006/0178949 | A1 | 8/2006 | McGrath |
| 2006/0206709 | A1 | 9/2006 | Labrou |
| 2007/0033493 | A1 | 2/2007 | Flake |
| 2008/0091342 | A1 | 4/2008 | Assael |
| 2008/0195428 | A1 * | 8/2008 | O'Sullivan ............ G08G 1/123 705/6 |
| 2008/0255722 | A1 | 10/2008 | McClellan |
| 2008/0313723 | A1 | 12/2008 | Naono |
| 2009/0111491 | A1 | 4/2009 | Lemberg |
| 2009/0157490 | A1 | 6/2009 | Lawyer |
| 2009/0192851 | A1 | 7/2009 | Bishop |
| 2009/0248587 | A1 * | 10/2009 | Van Buskirk .. G06Q 10/063112 707/999.005 |
| 2009/0265198 | A1 | 10/2009 | Lester |
| 2009/0300744 | A1 | 12/2009 | Guo |
| 2010/0131589 | A1 | 5/2010 | Lawyer |
| 2010/0211498 | A1 * | 8/2010 | Aabye ................. G06Q 20/326 705/39 |
| 2010/0273445 | A1 | 10/2010 | Dunn |
| 2010/0274691 | A1 | 10/2010 | Hammad |
| 2010/0293094 | A1 | 11/2010 | Kolkowitz |
| 2010/0306834 | A1 | 12/2010 | Grandison |
| 2010/0332400 | A1 | 12/2010 | Etchegoyen |
| 2011/0023101 | A1 | 1/2011 | Vernal |
| 2011/0145137 | A1 | 6/2011 | Driemeyer |
| 2011/0185056 | A1 | 7/2011 | McHugh |
| 2011/0202466 | A1 | 8/2011 | Carter |
| 2011/0251951 | A1 | 10/2011 | Kolkowitz et al. |
| 2011/0314548 | A1 | 12/2011 | Yoo |
| 2012/0040692 | A1 * | 2/2012 | Baba ..................... G01S 19/40 455/456.1 |
| 2012/0072384 | A1 | 3/2012 | Schreiner |
| 2012/0130627 | A1 | 5/2012 | Islam |
| 2012/0149049 | A1 | 6/2012 | Torres |
| 2012/0209970 | A1 | 8/2012 | Scipioni |
| 2012/0232943 | A1 | 9/2012 | Myr |
| 2012/0246720 | A1 | 9/2012 | Xie |
| 2012/0283893 | A1 | 11/2012 | Lee |
| 2012/0292388 | A1 * | 11/2012 | Hernandez ......... G06Q 20/3223 235/379 |
| 2012/0309539 | A1 | 12/2012 | Smith |
| 2012/0311036 | A1 | 12/2012 | Huhn |
| 2013/0018795 | A1 * | 1/2013 | Kolhatkar .......... G06Q 20/4016 705/44 |
| 2013/0086169 | A1 | 4/2013 | Bruich |
| 2013/0090086 | A1 * | 4/2013 | Lopez Lopez ........ H04W 12/10 455/410 |
| 2013/0132547 | A1 | 5/2013 | Reed |
| 2013/0139236 | A1 | 5/2013 | Rubinstein |
| 2013/0159195 | A1 | 6/2013 | Kirillin |
| 2013/0172085 | A1 | 7/2013 | Harrington |
| 2013/0185791 | A1 | 7/2013 | Xie |
| 2013/0214898 | A1 * | 8/2013 | Pineau .................. H04W 4/023 340/5.6 |
| 2013/0214902 | A1 * | 8/2013 | Pineau .................. H04L 63/101 340/5.61 |
| 2013/0232549 | A1 | 9/2013 | Hawkes |
| 2013/0282504 | A1 | 10/2013 | Lessin |
| 2013/0282810 | A1 | 10/2013 | Lessin |
| 2013/0282812 | A1 | 10/2013 | Lessin |
| 2013/0298192 | A1 | 11/2013 | Kumar |
| 2013/0340052 | A1 * | 12/2013 | Jakobsson ............. H04L 63/083 726/5 |
| 2014/0013107 | A1 | 1/2014 | Clair |
| 2014/0032406 | A1 | 1/2014 | Roach |
| 2014/0037184 | A1 * | 2/2014 | Gorski ................. G06V 30/274 382/137 |
| 2014/0051465 | A1 | 2/2014 | Ruys |
| 2014/0122216 | A1 | 5/2014 | Hasson |
| 2014/0129420 | A1 | 5/2014 | Howe |
| 2014/0179434 | A1 | 6/2014 | Xu |
| 2014/0196110 | A1 | 7/2014 | Rubinstein |
| 2014/0196159 | A1 | 7/2014 | Mangalam-Palli |
| 2014/0230026 | A1 | 8/2014 | Forero |
| 2014/0237570 | A1 | 8/2014 | Shishkov |
| 2014/0270411 | A1 * | 9/2014 | Shu ..................... G06V 10/757 382/118 |
| 2014/0280568 | A1 | 9/2014 | Postrel |
| 2014/0282977 | A1 | 9/2014 | Madhu |
| 2015/0065166 | A1 * | 3/2015 | Ward ..................... H04W 4/023 455/456.1 |
| 2015/0089514 | A1 | 3/2015 | Grewal |
| 2015/0095235 | A1 | 4/2015 | Dua |
| 2015/0106900 | A1 | 4/2015 | Pinski |
| 2015/0113622 | A1 | 4/2015 | Dua |
| 2015/0142595 | A1 | 5/2015 | Acuna-Rohter |
| 2015/0163217 | A1 | 6/2015 | Lo |
| 2015/0172277 | A1 | 6/2015 | Hoggan |
| 2015/0186492 | A1 | 7/2015 | Shalita |
| 2015/0189026 | A1 | 7/2015 | Cohen |
| 2015/0222619 | A1 | 8/2015 | Hughes |
| 2015/0228000 | A1 * | 8/2015 | Bijor ..................... H04W 4/021 705/13 |
| 2015/0278692 | A1 | 10/2015 | Milewski |
| 2015/0304268 | A1 | 10/2015 | Byttow |
| 2015/0307107 | A1 | 10/2015 | Tamari |
| 2015/0319199 | A1 | 11/2015 | Yanashima |
| 2015/0347591 | A1 | 12/2015 | Bax |
| 2015/0348221 | A1 * | 12/2015 | Pedersen ............. G06Q 10/0639 705/7.38 |
| 2015/0381668 | A1 | 12/2015 | Kurabayashi |
| 2016/0006717 | A1 | 1/2016 | Ji |
| 2016/0014457 | A1 | 1/2016 | Dua |
| 2016/0048831 | A1 | 2/2016 | Ongchin |
| 2016/0048837 | A1 * | 2/2016 | Jin ..................... G06Q 20/4014 705/76 |
| 2016/0057154 | A1 | 2/2016 | Ferguson |

(56) References Cited

U.S. PATENT DOCUMENTS

| | | | |
|---|---|---|---|
| 2016/0078706 | A1 | 3/2016 | Pawlik |
| 2016/0219046 | A1 | 7/2016 | Ballard |
| 2016/0292679 | A1 | 10/2016 | Kolin |
| 2016/0300185 | A1 | 10/2016 | Zamer |
| 2016/0307289 | A1 | 10/2016 | Choksi |
| 2016/0366168 | A1 | 12/2016 | Cazin |
| 2017/0039567 | A1 | 2/2017 | Stern |
| 2017/0039890 | A1* | 2/2017 | Truong ............... G07C 5/02 |
| 2017/0052034 | A1 | 2/2017 | Magazinik |
| 2017/0075894 | A1 | 3/2017 | Poornachandran |
| 2017/0111364 | A1* | 4/2017 | Rawat ............... G06F 21/316 |
| 2017/0200061 | A1 | 7/2017 | Julian |
| 2017/0236411 | A1* | 8/2017 | Sumers ............... G08G 1/0112 |
| | | | 701/117 |
| 2017/0309552 | A1* | 10/2017 | Singleton ............... H04W 12/06 |
| 2018/0124207 | A1* | 5/2018 | Marueli ............... G06Q 50/10 |
| 2018/0302743 | A1 | 10/2018 | Bai |
| 2018/0310135 | A1 | 10/2018 | Cirit |
| 2018/0352376 | A1* | 12/2018 | Shuman ............... G06F 16/29 |
| 2019/0102873 | A1* | 4/2019 | Wang ............... G06V 10/20 |
| 2019/0139450 | A1 | 5/2019 | Truong |
| 2019/0154454 | A1 | 5/2019 | Verma |
| 2019/0164432 | A1 | 5/2019 | Quitoriano |
| 2019/0205785 | A1* | 7/2019 | Volk ............... G06N 3/0454 |
| 2019/0228111 | A1 | 7/2019 | Aliakseyeu |
| 2019/0279510 | A1 | 9/2019 | O'Sullivan |
| 2020/0051059 | A1 | 2/2020 | Filler |
| 2020/0097753 | A1 | 3/2020 | Ash |
| 2020/0112570 | A1 | 4/2020 | Yang |
| 2020/0168100 | A1 | 5/2020 | Quitoriano |
| 2021/0295707 | A1 | 9/2021 | Quitoriano |

FOREIGN PATENT DOCUMENTS

| | | |
|---|---|---|
| EP | 2333582 | 6/2011 |
| JP | 2014216736 | 11/2014 |
| KR | 10-2007-0054784 | 5/2007 |
| TW | M569886 | 11/2018 |
| WO | WO 2012/0167319 | 12/2012 |
| WO | WO 2016/0127109 | 8/2016 |
| WO | WO 2017/083841 | 5/2017 |
| WO | WO 2017/0114125 | 7/2017 |

OTHER PUBLICATIONS

Ghazizadeh, "Reputation Model for B2C E-commerce: A Trust Flow Based on Social Networks", 2011 International Conference on Research and Innovation in Information Systems (ICRIIS), Nov. 23-24, 2011, 6 pages.

Wilson, "Beyond Social Graphs: User Interactions in Online Social Networks and their Implications", ACM Transactions on the Web, vol. 6, No. 4, article 17, Nov. 2012, 31 pages.

Chard, "A Social Content Delivery Network for Scientific Cooperation: Vision, Design, and Architecture", 2012 SC Companion: High Performance Computing, Networking, Storage and Analysis (SCC), Nov. 10-16, 2012, 10 pages.

Nagy, "PeerShare: A System Secure Distribution of Sensitive Data Among Social Contacts", NordSec Proceedings of the 18th Nordic Conference on Secure IT Systems—vol. 8202, Oct. 18-21, 2013, pp. 154-165.

Agarwal, "Detecting Malicious Activities using Backward Propagation of Trustworthiness over Heterogeneous Social Graph", 2013 IEEE/WIC/ ACM International Conferences on Web Intelligence (WI) and Intelligent Agent Technology (IAT), 2013, pp. 290-291.

CSC Leading Edge Forum, "Data rEvolution", 2011, 68 pages.

Kirschner, "Implementing social network analysis for fraud prevention", CGI Group Ind. (2011).

Gondor, Sebastien, "Sonic: Towards seamless interaction in heterogeneous distributed OSN ecosystems", Wireless and Mobile Computing, Network and Communications (WiMob), 2014 IEEE 10th International Conference on, IEEE 2014.

Lima, "Fraud Detection in web transactions", Proceedings of the 18th Brazilian symposium on Multimedia and the web. ACM 2012.

Bonneau, "The privacy jungle: On the market for data protection in social networks", Economics of information, security and privacy, Springer, Boston MA 2010.

Dhivya, "Averting Intruder Attach on Social Network by Data Sanitization", International Journal of Computer Science and Engineering 4.2 (2016).

Boshmaf, Security analysis of malicious socialbots on the web. Diss. University of British Columbia, 2015.

EESR dated Dec. 8, 2017 in EP 15832658.7.

White, "How Computers Work", Oct. 15, 2003, Paul Boger, Illustrated by Timothy Edward.

WRO in PCT/US2019/051334 dated Dec. 18, 2019.

ISR and Written Opinion in PCT/US2019/055415 dated Feb. 4, 2020.

"Advanced Technologies for Detecting and Preventing Fraud at Uber", Jun. 14, 2018 [Retrieved on Jan. 29, 2020 from https://eng.uber.com/advanced-technologies-detecting-preventing-fraud-uber/].

Zhao B. and Chen, Q., "Location Spoofing in a Location-Based Game: A Case Study of Pokemon Go." International Cartographic Conference, May 31, 2017, pp. 21-32 (Abstract Only).

ISR and Written Opinion in PCT/US2018/062297 dated Feb. 13, 2019.

IPRP in PCT/2018/062297 dated Jun. 11, 2020.

Examination Report No. 1 in AU 2015301443 dated Jun. 16, 2020.

IPRP in PCT/US2019/051334 dated Apr. 1, 2021.

IPRP in PCT/US2019/055415 dated Apr. 22, 2021.

Office Action in EP 15832658.7 dated Apr. 23, 2021.

\* cited by examiner

LOCATION-SPOOFING DETECTION SYSTEM FOR A NETWORK SERVICE

CROSS-REFERENCE TO RELATED APPLICATION

This application is a continuation of U.S. patent application Ser. No. 16/155,382, filed on Oct. 9, 2018, which is hereby incorporated by reference in its entirety.

BACKGROUND

Location data obtained from positioning systems (e.g., a global positioning system), such as by global positioning system components on computing devices, can be essential for location-based network services, such as for transport provider selection and for tracking the fulfillment of transport requests (e.g., ride requests or delivery requests) made by requesting users.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
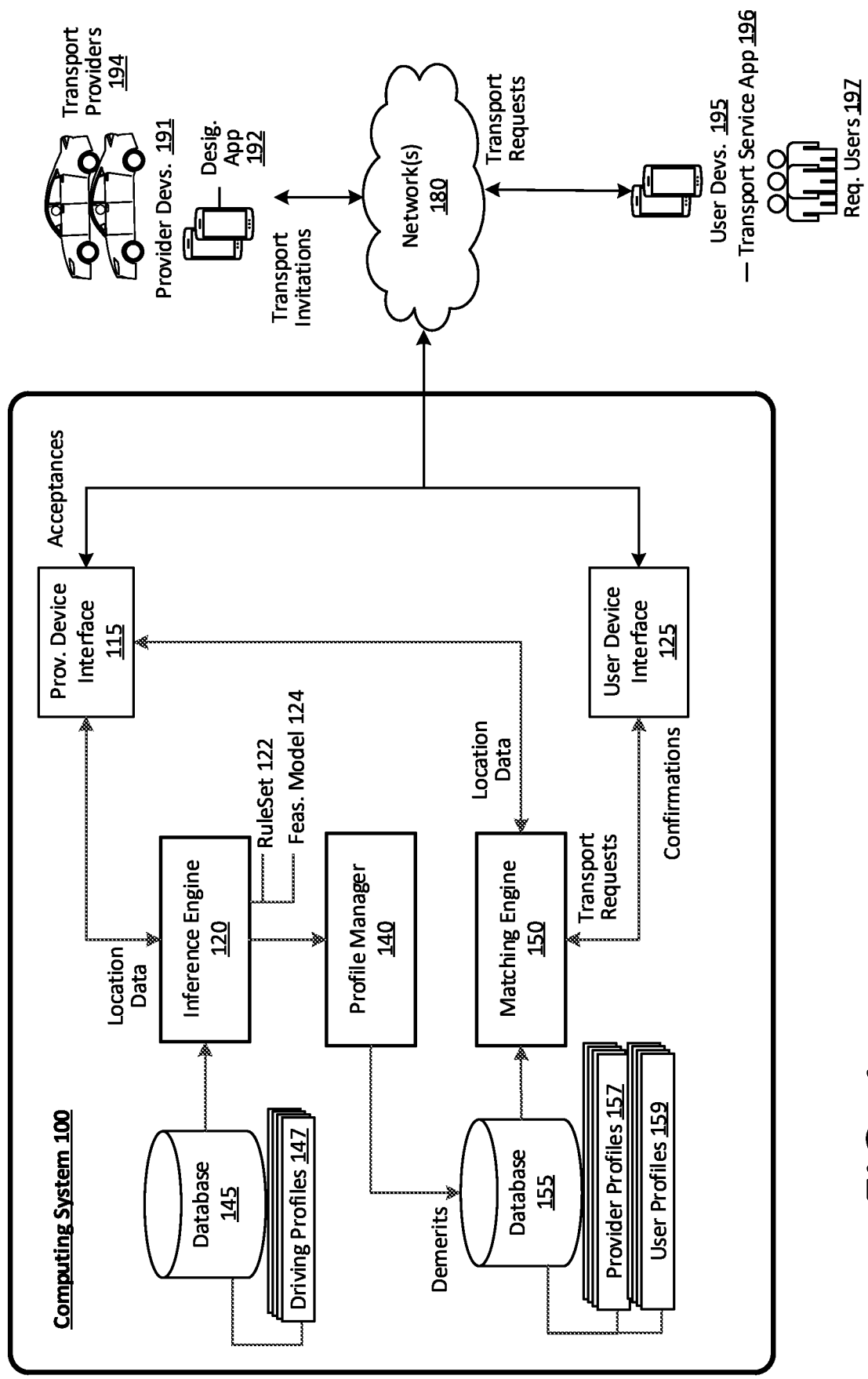
FIG. 1 is a block diagram illustrating an example network computing system implementing location-spoofing detection, in accordance with examples described herein.

Location-spoofing involves the operation of a location-spoofing program or application on a computing device that falsifies the actual or current location of the computing device. For example, global positioning system (GPS) spoofing attacks seek to deceive a GPS receiver on the computing device by broadcasting incorrect GPS signals that are configured to resemble normal signals from GPS satellites, or rebroadcasting GPS signals captured elsewhere at a different time (e.g., through the use of a third-party GPS spoofing application program). In another example, a location-spoofing application operating on a computing device can cause another application operating on the computing device to transmit false location information (e.g., a fake current location as opposed to an actual current location) to a network service associated with that application. With traditional taxis, fraudulent activity may involve manipulating fare meters or taximeters by, for example, driving indirect routes, adding erroneous surcharges, changing a fare code to a more expensive fare code, or other regrettable actions. With the advent of application-based, network services (e.g., on-demand transport services), more elaborate fraudulent methods have been conceived, including location-spoofing which can enable certain transport providers to, for example, pretend to be at a certain location, pretend to have driven along a route, insert additional location points along a route to increase the distance traveled, jump or teleport ahead of other transport providers in a queue (e.g., at an airport), etc.

A computing system is described herein that supports the detection of location-spoofing by transport providers of an application-based, on-demand transport service. The computing system (and/or the designated application operating on the transport provider's device) can implement location-spoofing detection techniques described herein for an application-based, network service (e.g., an on-demand transport service). The computing system can include a network communication interface that communicates, over one or more networks, with computing devices of transport providers operating throughout a region and computing devices of requesting users seeking transport services. In various examples, the computing system can receive transport requests from users through a dedicated transport service application executing on the computing devices of the requesting users. The transport providers can execute a designated transport provider application on their computing devices to receive transport invitations that enable the transport provider to accept and service transport requests received from the requesting users.

For a received transport request, the computing system can perform a selection operation based on for example, the distance and/or time to the pick-up location, the transport supply in surrounding subregions of the rendezvous location, and/or a set of utility metrics. The selection operation can result in a transport provider being selected to service the transport request (e.g., a transport provider that is optimally close, traveling in a direction towards the pick-up location and/or destination location, and/or has an optimal or maximum score as compared to other transport providers). In some implementations, the computing system can first determine a pool of candidate transport providers given a rendezvous location in a transport request, and then perform the selection operation with respect to the initial pool.

In identifying candidate transport providers, the computing system can receive, over one or more networks, location data from the computing devices of the transport providers as the transport providers operate throughout the transport service region. For one or more of the transport providers, the computing system can determine whether that transport provider's computing device is running a location-spoofing application or program based, at least in part, on the location data received from the computing device of the transport provider (e.g., the computing system can determine whether a transport provider is operating a location-spoofing application to behave fraudulently).

For example, the computing system can initially determine, based on the location data received from the computing device of the transport provider, a set of locational attributes of the transport provider. The set of locational attributes can comprise a position, a velocity, a current acceleration, an elevation of the transport provider, and/or various other location-based information. In some examples, the computing system can determine the set of locational attributes using one or more sets of sensor data and/or location data received from the computing device of the transport provider. For example, the computing system can determine an average speed of the transport provider between any two or more points along a route that the transport provider travels based on the time elapsed between the two or more points (e.g., using timestamps embedded in the received location data). The computing system can also determine, at any time, the course or heading of the transport provider.

In certain implementations, the computing system can further compile and store sets of driving profiles for various road segments of the transport service region. These driving profiles can indicate the typical driving speed or behaviors of transport providers driving through a corresponding road segment. The driving profiles can be constructed by the computing system using numerous data records of transport providers driving through the corresponding road segment. Furthermore, each data record of a driving profile of a given road segment can include timestamps, a description or indication of the current traffic conditions, traffic signal states, the average speed of the transport provider through the road segment, and the like. In some aspects, a driving profile can include a minimum feasible time to drive from a start point to an end point of the road segment corresponding to the driving profile. This minimum feasible time can be weather condition and/or traffic condition dependent, according to various implementations, and can therefore fluctuate given the current weather and/or traffic conditions of the road segment. In some aspects, the minimum feasible time can be factored or received as an input to a feasibility model described herein.

In certain examples, the computing system can receive additional sensor data from the computing device of the transport provider, such as image data, audio data, barometer data, accelerometer, gyroscopic, and/or magnetometer data (e.g., from an inertial measurement unit (IMU) of the computing device). In some aspects, the computing system can correlate these additional data to the location-data received from the positioning system of the transport provider's computing device (e.g., a GPS receiver) to at least partially determine whether the transport provider is running a location-spoofing application.

Additionally or alternatively, the computing system can determine whether the transport provider is operating a location-spoofing application by running the set of locational attributes through a location-based feasibility model. The feasibility model can comprise one or more algorithms (e.g., machine learning algorithms) programmed to determine a realistic value indicating whether the locational attributes of the transport provider are possible, feasible, unrealistic, or impossible. In certain implementations, the feasibility model can output a binary answer (e.g., correlative to a yes or no answer) indicating whether the transport provider is operating a location-spoofing application. In variations, the feasibility model can output a probability or score that the transport provider is operating a location-spoofing application (e.g., a score from 0 to 1).

In various examples, the computing system can determine whether the transport provider is operating a location-spoofing application by running the set of locational attributes through a set of computational rules. For example, the computing system can initially determine extreme cases based on calculated or observed speed of drivers through a particular road segment. In such examples, the set of computational rules can include a point-to-point computation indicating whether the velocity of the transport provider exceeds a feasibility threshold (e.g., 90 miles per hour). If so, then the computing system can infer that the transport provider is operating a location-spoofing application. If not, then the computing system can optionally continue to determine whether the transport provider is operating a location-spoofing application in accordance with the examples described herein.

In certain examples, given a set of locational attributes of a transport provider, the computing system can perform a lookup in the driving profile database for a matching driving profile corresponding to a road segment traversed by the transport provider. The computing system may further access, as input into the feasibility model, the traffic conditions at the time the driving traversed the road segment (e.g., current traffic conditions), the time of day, day of the week, weather conditions, and the like. The computing system may then compare the locational attributes of the transport provider with the matching driving profile to determine whether the locational attributes are feasible or exceed a set of feasibility thresholds. These feasibility thresholds can comprise acceleration at any given time, horizontal velocity, and/or elevation change thresholds that, when exceeded, indicate the use of a location-spoofing application. In some aspects, the computing system can further run a motion simulation of the transport provider along the road segment based on the locational attributes to determine or confirm that the transport provider is operating a location-spoofing program or application.

In the process of selecting a transport provider to service a transport request, the computing system can filter out or exclude any transport provider that is determined to be running a location-spoofing application. For example, the computing system can determine whether a transport provider is operating a location-spoofing application after determining the pool of candidate transport providers, or can make the determination as a final check before transmitting the transport invitation to the transport provider.

In certain implementations, the computing system can include a database comprising user profiles of the requesting users, and driver profiles of the transport providers. The user profiles can include account information, unique identifiers of the requesting users, user preferences, and historical data corresponding to the user's utilization of the on-demand transport service. The driver profiles can include personal information of the transport provider, such as the transport provider's vehicle type, model, a driver rating as determined by passengers that the transport provider has transported, earnings data, bonus information, and a historical record of any demerits and the nature of those demerits in connection with the on-demand transport service. Such demerits may indicate instances in which the transport provider treated a passenger poorly, instances of attempted fraud (e.g., vomit fraud), location-spoofing instances (e.g., queue jumping attempts), and the like. In some aspects, when the demerits of a transport provider cross a predetermined threshold, the computing system can exclude the transport provider from all future matching operations.

According to various examples provided herein, the computing system can input a demerit in the driver profile of the transport provider in response to determining that the transport provider is operating a location-spoofing application. In some aspects, the demerit can affect at least one of a driver rating of the transport provider (e.g., exclude the transport provider from any currently offered incentives).

Certain implementations provide for an initial data quality filter that enables the computing system to process only high-quality location data. For example, upon receiving location data from a computing device of a transport provider, the computing system can initially determine whether the quality of the location data is above a certain quality threshold, and not encumbered by distortion or other multipath effects (e.g., caused by trees, buildings, narrow streets, etc.). If the data quality is above the quality threshold, then the computing system can further process the location data to determine whether the data are a product of location-spoofing.

It is contemplated herein that the location-spoofing detection techniques described throughout the present disclosure will increase in precision and accuracy, as well as the machine learning models implemented to construct driving profiles, establish feasibility thresholds given current locational attributes, and ultimately determine whether any given transport provider is operating a location-spoofing program at any given time. The examples described herein further enable a computing system to remotely determine or infer the existence and operation of a third-party location-spoofing program or application on a remote device (e.g., on the computing device of a transport provider) without accessing the memory store of the computing device itself (e.g., based solely or partially on location data received). It is further contemplated that such techniques described herein can be implemented across any transport service region of any size and in any geographic area.

Among other benefits, examples described herein achieve a technical effect of reducing or eliminating deceit perpetrated by the few transport providers that seek to utilize location-spoofing technology to, for example, increase fares, teleport to the front of queues, add location points to a trip, and the like. The example computing systems described herein can comprise inference engines that may be continually improved upon to provide various technical solutions to the technical and practical problems created by location-spoofing programs in the field of transportation services.

As used herein, a "user" of the network service can comprise a transport provider or a driver of an on-demand transport service. A "requesting user" or "requester" can comprise a rider or passenger requesting a ride by utilizing the on-demand transport service.

As used herein, a computing device refers to devices corresponding to desktop computers, cellular computing devices and/or smartphones, personal digital assistants (PDAs), laptop computers, virtual reality (VR) or augmented reality (AR) headsets, tablet computing devices, etc., that can provide network connectivity and processing resources for communicating with the system over a network. A computing device can also correspond to custom hardware, in-vehicle devices of automobiles, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 is a block diagram illustrating an example network computing system 100 implementing location-spoofing detection, in accordance with examples described herein. The network computing system 100 can include a database 155 that stores transport provider profiles 157 and user profiles 159, and a profile manager 140 that operates to set up, configure, add to, and reconfigure the profiles 157, 159 based on status updates, completed transport requests, inputted ratings, and the like. The computing system 100 can further include a matching engine 150 that receives location data from the computing devices 191 of the transport providers 194 (e.g., over a provider device interface 115 via an executing designated application 192) and transport requests from the computing devices 195 of the requesting users 197 (e.g., over a user device interface 125 via an executing transport service application 196) over one or more networks 180. The matching engine 150 can match the transport providers 194 with the users 197 in accordance with the examples described herein.

For example, a requesting user 197 can submit a transport request via the transport service application 196 executing on the computing device 195 of the user 197. The transport request can comprise a request for personal transport (e.g., a rideshare request), package or mail delivery, freight transport, and/or food and drink delivery. The matching engine 150 can track the locations of transport providers 194 operating throughout the transport service region, and determine a set of candidate transport providers within a certain proximity of the requesting user 197. The matching engine 150 may then select an optimal transport provider 194 from the candidate set to service the transport request (e.g., based on distance and/or time to the requesting user 197, a pick-up location, or delivery location). Once selected, the matching engine 150 can transmit a transport invitation to the computing device 191 of the selected transport provider 194

(e.g., over the network(s) 180 via the executing application 192). The transport provider 194 can accept or decline the transport invitation. If the transport provider 194 elects to decline the invitation, the matching engine 150 can sequentially submit the transport invitation to additional transport providers until the invitation is accepted.

The computing system 100 can further include an inference engine 120 that can receive the location data from the computing devices 191 of the transport providers 194, and determine whether a given transport provider 194 is operating location-spoofing software on the computing device 191, in accordance with the examples described herein. For example, the inference engine 120 can execute a computational ruleset 122 and/or a feasibility model 124 based on the location data to determine whether any anomalous locational attributes are present (e.g., extreme acceleration or velocity indications). In determining whether location-spoofing software is being utilized by a transport provider 194, the inference engine 120 can access a database 145 comprising driving profiles 147 of particular road segments. The driving profiles 147 can indicate the typical driving speed or behaviors of transport providers 194 or other vehicles driving through the corresponding road segment. Each data record of a driving profile 147 of a given road segment can include metadata indicating one or more timestamps, a description or indication of the current traffic conditions, traffic signal states, the average speed of transport providers 194 through the road segment, and the like. In some aspects, each driving profile 147 can be associated with a minimum feasible time to drive from a start point to an end point of the road segment corresponding to the driving profile 147.

At any given time, the inference engine 120 can determine whether a particular transport provider's computing device 191 is running a location-spoofing application or program. For example, the inference engine 120 can utilize the location data received from the computing device 191 to determine a set of locational attributes of the transport provider 194, such as the transport provider's position, velocity, current acceleration, elevation, heading, and the like. Additionally, the inference engine 120 can determine an average speed of the transport provider 194 between any two or more points along a current route on which the transport provider travels. In certain examples, the two or more location points can correspond to a particular driving profile 147, which the inference engine 120 can access to compare with locational attributes of the transport provider 194.

In certain examples, the inference engine 120 can receive additional sensor data from the computing device 191 or vehicle of the transport provider 194, such as image data, audio data, barometer data, accelerometer, gyroscopic, and/or magnetometer data (e.g., from an inertial measurement unit (IMU) of the computing device 191). In some aspects, the computing system can correlate these additional data to the location-data received from the positioning system of the transport provider's computing device 191 (e.g., a GPS receiver) to at least partially determine whether the transport provider 194 is operating a location-spoofing application.

Additionally or alternatively, the inference engine 120 can determine whether the transport provider 194 is operating a location-spoofing application by running the set of locational attributes through a location-based feasibility model 124. The feasibility model 124 can comprise one or more algorithms (e.g., machine learning algorithms) programmed to determine a realistic value indicating whether the locational attributes of the transport provider 194 are possible, feasible, unrealistic, or impossible. In certain implementations, the feasibility model 124 can output a binary answer (e.g., correlative to a yes or no answer) or a probability indicating whether the transport provider 194 is operating a location-spoofing application on the transport provider's computing device 191. If the probability is above a certain probability threshold (e.g., 90% in the affirmative), then the inference engine 120 can conclude that the transport provider is using location-spoofing resources to mislead the on-demand transport service.

In certain implementations, the feasibility model 124 can receive various inputs, such as the location data from the transport provider 194, the set of locational attributes determined by the inference engine 120, and one or more matching driving profiles 147 of one or more road segments on which the transport provider 194 travels. In some aspects, the inference engine 120 can input additional factors into the feasibility model 124, such as sensor data (e.g., IMU data) from the computing device 191 of the transport provider 194. Based on the various inputs, the feasibility model 124 can identify any location-based anomalies, such as unreasonable jumps in speed, acceleration, elevation changes, and the like, and can output an answer or probability indicating whether or not the transport provider 194 is using location-spoofing resources. For example, the feasibility model 124 can identify, in the location data, an extreme jump in acceleration (e.g., exceeding 5 g, or 49 m/s2), positional teleportation, or extreme velocities (e.g., exceeding 100 miles per hour). Additionally or alternatively, the feasibility model 124 can attempt to correlate sensor data (e.g., IMU data from the transport provider's computing device 191) with the location data to identify any uncorrelated anomalies (e.g., an acceleration spike in the location data that is not present in the IMU data). If the data correlate properly, the feasibility model 124 can output a confirmation that the transport provider 194 is not using location-spoofing software. However, if the data do not correlate, then the feasibility model 124 can, for example, flag each uncorrelated instance or anomaly in the location data, and generate a report identifying such instances or anomalies concluding that location-spoofing software is being utilized.

In addition or as an alternative, the inference engine 120 can determine whether the transport provider 194 is running location-spoofing software by executing a ruleset 122 on the set of locational attributes. In some examples, the inference engine 120 can initially determine extreme cases for the road segment on which the transport provider travels based on calculated or observed velocity. The ruleset 122 can comprise a point-to-point computation indicating whether the velocity of the transport provider 194 exceeds a feasibility threshold (e.g., 90 miles per hour). If so, then the inference engine 120 can determine that the transport provider 194 is using location-spoofing resources to attempt to mislead the on-demand transport service implemented by the matching engine 150.

In some aspects, the inference engine 120 can run a motion simulation of the transport provider 194 along a road segment of a matching driving profile 147 based on the locational attributes. The motion simulation can expose any anomalous behavior indicative of the transport provider 194 utilizing location-spoofing resources. For example, any sudden jumps or teleportation, unreasonable elevation changes, and the like may be revealed by the motion simulation.

In certain implementations, the computing system 100 can include a database 155 comprising user profiles 159 of the requesting users 197, and provider profiles 157 of the transport providers 194. The user profiles 159 can include account information, unique identifiers of the requesting users 197, user preferences, and historical data corresponding to the user's utilization of the on-demand transport service. The provider profiles 157 can include personal information of the transport provider 194, such as the transport provider's vehicle type, model, a driver rating as determined by passengers that the transport provider 194 has transported, earnings data, bonus information, and a historical record of any demerits and the nature of those demerits in connection with the on-demand transport service. Each demerit can be associated with a particular action of the transport provider 194, such as an altercation with a passenger, an instance of using location-spoofing in connection with the on-demand transport service, and the like.

According to various examples described herein, when the inference engine 120 determines that a transport provider 194 is utilizing location-spoofing technology, the inference engine 120 can trigger a profile manager 140 of the computing system 100 to flag the driver profile 157 of the transport provider 194 to indicate that the transport provider 194 is currently utilizing location-spoofing software. The profile manager 140 can track the behavior and/or performance of each transport provider 194. In some aspects, when the demerits of a transport provider 194 cross a predetermined threshold, the matching engine 150 can exclude the transport provider 194 from future matching operations (e.g., for the rest of the day), or can exclude the transport provider 194 from participating in the on-demand transport service.

In certain implementations, when the matching engine 150 determines a candidate set of transport providers 194 for a given transport request, the matching engine 150 can perform a lookup in the provider profiles 157 to determine whether any of the transport providers 194 in the candidate set has been flagged as currently utilizing location-spoofing software. If the matching engine 150 determines that one or more transport providers 194 in the candidate set are utilizing location-spoofing software, the matching engine 150 can exclude those transport providers 194 from the current matching operation. Accordingly, any transport provider 194 seeking to mislead the on-demand transport service by using location-spoofing software in order to gain a potential matching advantage can be excluded from any current matching operations. In certain examples, the profile manager 140 can further notify the transport provider 194 of the computing system's awareness that the transport provider 194 is using location-spoofing software.

Computing Device

Figure 2:
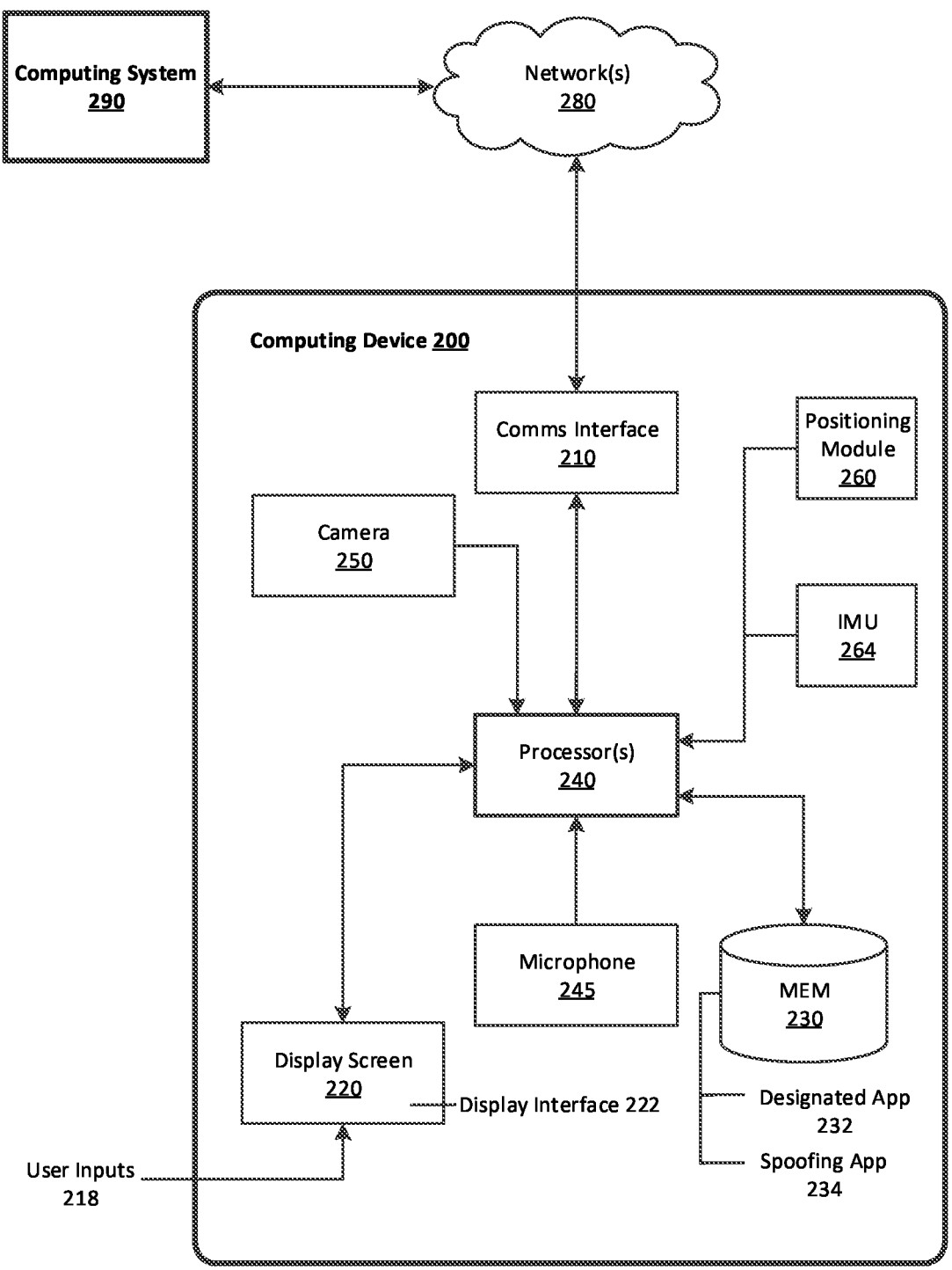
FIG. 2 is a block diagram illustrating an example driver computing device executing a service application for communicating with the network computing system, according to examples described herein.

FIG. 2 is a block diagram illustrating an example computing device 200 of a transport provider executing and operating a designated transport service application 232 for communicating with the computing system 290 (e.g., computing system 100 shown and described with respect to FIG. 1). In various implementations, the computing device 200 can comprise a mobile computing device, such as a smartphone, tablet computer, laptop computer, VR or AR headset device, and the like. As such, the computing device 200 can include telephony features such as a microphone 245, a camera 250, and a communication interface 210 to communicate with external entities using any number of wireless communication protocols. The computing device 200 can further include a positioning module 260 (e.g., a GPS receiver) and an inertial measurement unit 264 that includes one or more accelerometers, gyroscopes, or magnetometers.

In certain aspects, the computing device 200 can store the designated application 232 in a local memory 230. In variations, the memory 230 can store additional applications executable by one or more processors 240 of the computing device 200, enabling access and interaction with one or more host servers over one or more networks 280. One such application can comprise a location-spoofing application 234 that the computing device 200 can execute to provide incorrect location data to the computing system 290, as provided herein. For example, the location-spoofing application 234 can be executing in concert with the designated application 232 to enable the transport provider to mislead the computing system 290 regarding the position of the transport provider.

In response to a user input 218 by a transport provider (e.g., the selection of an icon representing the designated application 232), the designated application 232 can be executed by a processor 240, which can cause a display interface 222 to be generated on a display screen 220 of the computing device 200. In various implementations, the display interface 222 can enable transport provider to view and accept transport invitations and follow map directions to rendezvous and/or drop-off locations.

In various examples, the positioning module 260 can provide location data indicating the current location of the transport provider to the network computing system 290 to, for example, enable the computing system 290 match the transport provider with requesting users. As described herein, the location data can be utilized by the computing system 290 to determine whether the computing device 200 is currently executing the location-spoofing application 234, as described herein. In further implementations, the computing device 200 can also transmit additional sensor data to the computing system 290, such as image data from the camera 250, audio data from the microphone 245, and IMU data from the IMU 264 to enable the computing system 290 to determine whether the location-spoofing application 234 is being utilized by the computing device 200.

Methodology

Figure 3A:
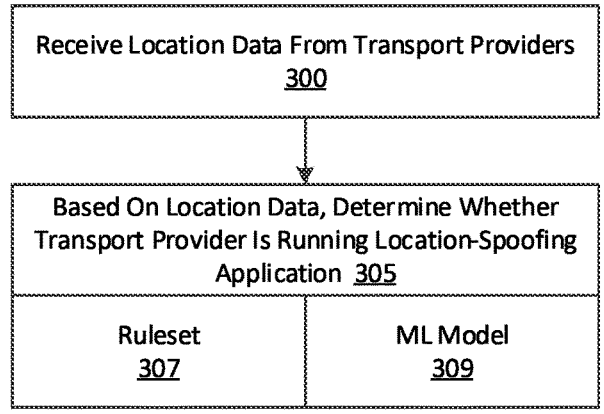
FIGS. 3A and 3B are flow charts describing example methods of detecting location-spoofing by transport providers, according to various examples.
Figure 3B:
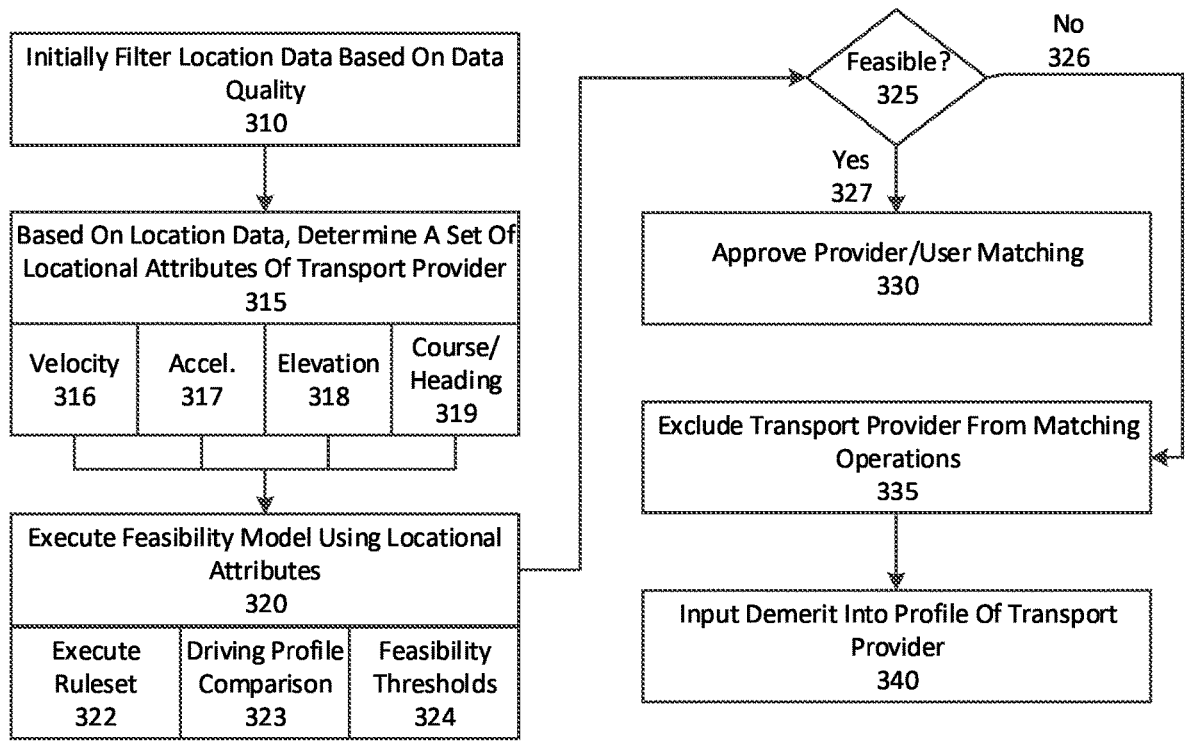

FIGS. 3A and 3B are flow charts describing example methods of detecting location-spoofing by transport providers, according to various examples. In the below discussion of FIGS. 3A and 3B, reference may be made to reference characters representing various features shown and described with respect to FIGS. 1 and 2. Furthermore, the processes described with respect to FIGS. 3A and 3B may be performed by an example computing system 100 as shown and described in connection with FIG. 1. Referring to FIG. 3A, the computing system 100 can receive location data from transport providers 194 operating throughout a transport service region (300). As described herein, the location data can indicate a position, velocity, heading, elevation, etc. of the transport provider 194. Based on the location data, the computing system 100 can determine whether a particular transport provider 194 is running a location-spoofing application on the computing device 191 of the transport provider 194 (305). For example, the computing system 100 can execute a ruleset 122 on the location data to determine, for example, whether the velocity of the transport provider 194 exceeds a certain reasonableness threshold (e.g., 90 miles per hour over a particular road segment) (307). Additionally or alternatively, the computing system 100 can execute a machine learning model (e.g., feasibility model 124) on the location data, which can output an indication of whether the transport provider 194 is using location-spoofing software (309).

FIG. 3B depicts another example method of detecting location-spoofing software, according to various examples. Referring to FIG. 3B, the computing system 100 can initially filter location data from the computing devices 191 of transport providers 194 based on data quality (310). For example, the computing system 100 may output inadequate results with unacceptable error when executing a feasibility model 124 on low quality location data. Accordingly, the initial filter can result in only high-quality location data being processed by the computing system 100. Based on the location data from a particular transport provider 194, the computing system 100 can determine a set of locational attributes of the transport provider 194 (315). As described herein, the locational attributes can comprise a velocity (316), acceleration (317), elevation (318), and/or a course or heading of the transport provider 194 (319).

Accordingly to various examples, the computing system 100 can execute a feasibility model 124 on the locational attributes (320). In certain examples, the computing system 100 can initially execute a ruleset 122 using the locational attributes to determine whether any of the locational attributes are clearly anomalous (e.g., indicating teleportation by the transport provider 194) (322). Additionally or alternatively, the computing system 100 can perform a driving profile comparison between the locational attributes and a matching driving profile 147 of a road segment on which the transport provider 194 travels (323). The matching driving profile 147 can indicate normal or average speeds and/or times for traversing the corresponding road segment. In some aspects, the matching driving profile 147 can also indicate a maximum speed or minimum time threshold for traversing the road segment. If, for example, the velocity of the transport provider exceeds the maximum speed threshold, the computing system 100 can conclude that the transport provider 194 is running a location-spoofing application.

In further implementations, execution of the feasibility model 124 can comprise a variety of additional factors, such as weather conditions (e.g., rain, snow, or sunshine), current traffic conditions, the time of day (e.g., rush hour), the time of week (e.g., weekday versus weekend), and the like. Given the set of additional factors, the computing system 100 adjust a set of feasibility thresholds corresponding to, for example, a maximum velocity threshold of traversing a particular road segment, a maximum acceleration at any given time, a maximum elevation change given a known road segment, and the like. According to various implementations, when the computing system 100 establishes the feasibility thresholds, the computing system 100 may then determine whether the locational attributes of the transport provider 194 meet, cross, or exceed any of the established thresholds, which would indicate that the transport provider 194 is using location-spoofing software.

In any case, the feasibility model 124 can output an indication of whether the transport provider's traversal of a given road segment is feasible (325), which can indicate whether the transport provider 194 is using location-spoofing software to mislead the computing system 100. If the traversal is feasible (327), the computing system 100 can approve the transport provider 194 for matching operations with requesting users 197 (330). However, if the computing system 100 determines that the transport provider's traversal of a particular road segment is not feasible (326), then the computing system 100 can exclude the transport provider 194 from any current matching operations (335). Additionally, the computing system 100 can input a demerit into the profile 157 of the transport provider 194 indicating an instance of the transport provider's attempted deceit (340). As described herein, the demerit can affect at least one of a driver rating or a compensation of the transport provider. For example, the computing system 100 can exclude the transport provider 194 from any currently offered bonus contracts. Additionally or alternatively, if a certain demerit threshold is crossed, the computing system 100 can exclude the transport provider 194 from the on-demand transport service altogether.

Hardware Diagram

Figure 4:
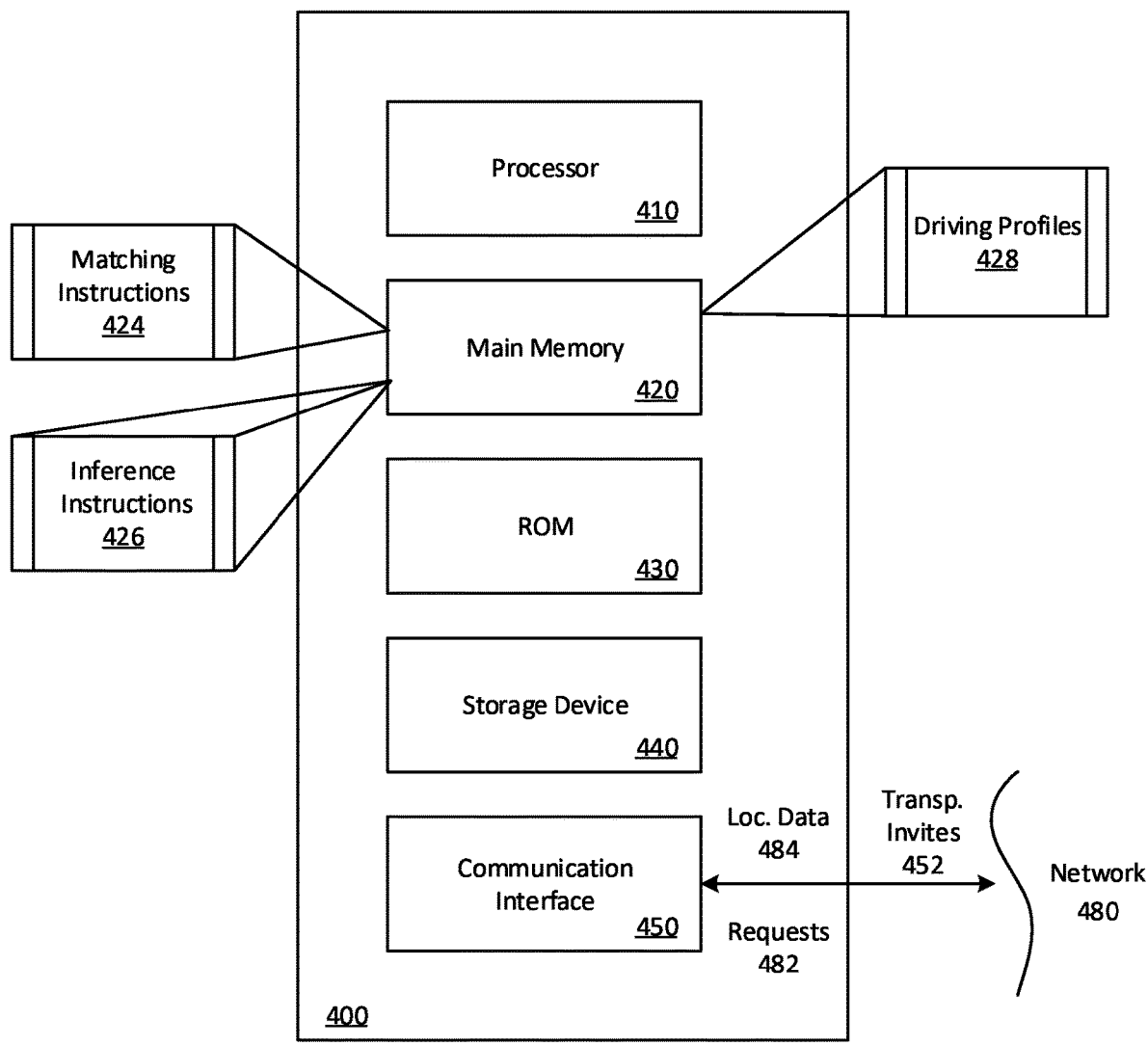
FIG. 4 is a block diagram that illustrates a computer system upon which examples described herein may be implemented.

FIG. 4 is a block diagram that illustrates a computer system 400 upon which examples described herein may be implemented. A computer system 400 can be implemented on, for example, a server or combination of servers. For example, the computer system 400 may be implemented as part of a network service, such as the on-demand transport service described in connection with FIGS. 1 through 3B. In the context of FIG. 1, the computing system 100 may be implemented using a computer system 400 described by FIG. 4. The computing system 100 may also be implemented using a combination of multiple computer systems 400 as described in connection with FIG. 4.

In one implementation, the computer system 400 includes processing resources 410, a main memory 420, a read-only memory (ROM) 430, a storage device 440, and a communication interface 450. The computer system 400 includes at least one processor 410 for processing information stored in the main memory 420, such as provided by a random-access memory (RAM) or other dynamic storage device, for storing information and instructions which are executable by the processor 410. The main memory 420 also may be used for storing temporary variables or other intermediate information during execution of instructions to be executed by the processor 410. The computer system 400 may also include the ROM 430 or other static storage device for storing static information and instructions for the processor 410. A storage device 440, such as a magnetic disk or optical disk, is provided for storing information and instructions.

The communication interface 450 enables the computer system 400 to communicate over one or more networks 480 (e.g., cellular network) through use of the network link (wireless or wired). Using the network link, the computer system 400 can communicate with one or more computing devices, one or more servers, and/or one or more databases. In accordance with examples, the computer system 400 receives transport requests 482 from mobile computing devices of individual users, and location data 484 from transport providers.

By way of example, the instructions and data stored in the memory 420 can be executed by the processor 410 to implement the functions of an example computing system 100 of FIG. 1. In various examples, the processor 410 can execute the matching instructions 424 to receive location data 484 from transport providers and transport requests 482 from requesting users, and match the requesting users with transport providers, and transmit transport invitations 452 to matched transport providers, as described herein. In certain implementations, the processor 410 executes the inference instructions 426 to receive the location data 484 from the transport providers, determine locational attributes of the transport provider, compare the locational attributes to a matching driving profile 428 of a road segment on which the transport provider traverses, and ultimately determine whether the transport provider is operating location-spoofing software.

Examples described herein are related to the use of the computer system 400 for implementing the techniques described herein. According to one example, those techniques are performed by the computer system 400 in response to the processor 410 executing one or more sequences of one or more instructions contained in the main memory 420. Such instructions may be read into the main memory 420 from another machine-readable medium, such as the storage device 440. Execution of the sequences of instructions contained in the main memory 420 causes the processor 410 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A computing system operating an application service, comprising:
    a network communication interface to communicate, over one or more networks, with computing devices of drivers;
    one or more processors; and
    one or more memory resources storing instructions that, when executed by the one or more processors, cause the computing system to:
        receive, over the one or more networks, location data from the computing devices, each of the computing devices operating a designated application associated with the application service;
        determine, based at least in part on the location data received from a computing device of a respective driver, a set of locational attributes of the respective driver;
        execute a location-based feasibility model to determine that one or more anomalous locational attributes are present in the set of locational attributes of the respective driver, wherein the location-based feasibility model outputs a probability that the respective driver is operating a location-spoofing application;
        based at least in part on determining that one or more anomalous locational attributes are present, determine that the computing device of the respective driver is operating a location-spoofing application; and
        in response to determining that the computing device of the respective driver is operating a location-spoofing application, associate a data set with a driver profile of the respective driver.

2. The computing system of claim 1, wherein the set of locational attributes comprises at least one of a position, a velocity, an acceleration, or an elevation of the respective driver.

3. The computing system of claim 1, wherein the location-spoofing application comprises a third-party global positioning system (GPS) spoofing application.

4. The computing system of claim 1, wherein the executed instructions cause the computing system to further determine whether the respective driver is operating a location-spoofing application by running the set of locational attributes through a set of computational rules that output a determination of whether the respective driver is operating a location-spoofing application.

5. The computing system of claim 4, wherein the set of computational rules comprises a point-to-point computation indicating whether a velocity of the respective driver exceeds a feasibility threshold.

6. The computing system of claim 1, further comprising:
    a database storing sets of driving profiles for various road segments of a region;
    wherein the executed instructions further cause the computing system to determine whether the respective driver is operating a location-spoofing application by (i) performing a lookup in the database for a matching driving profile corresponding to a road segment traveled by the respective driver as indicated by the location data received from the computing device of the respective driver, and (ii) comparing the set of locational attributes of the respective driver with the matching driving profile.

7. The computing system of claim 6, wherein each driving profile in the stored sets of driving profiles indicates a minimum feasible time to drive from a start point to an end point of a road segment corresponding to the driving profile.

8. The computing system of claim 1, wherein associating the data set with the driver profile of the respective driver causes the respective driver to be excluded from matching operations in connection with the application service.

9. The computing system of claim 1, wherein the executed instructions further cause the computing system to further determine whether the respective driver is operating a location-spoofing application by executing a motion simulation based on the location data received from the computing device of the respective driver.

10. The computing system of claim 1, wherein the one or more anomalous locational attributes correspond to the respective driver jumping ahead in a queue of drivers awaiting matches with requesting riders.

11. The computing system of claim 1, wherein the one or more anomalous locational attributes correspond to one or more location points being added by the location-spoofing application to increase distance traveled by the respective driver.

12. The computing system of claim 1, wherein associating the data set with the driver profile of the respective driver affects a compensation of the respective driver.

13. A non-transitory computer readable medium storing instructions that, when executed by one or more processors, cause the one or more processors to:
    receive, over one or more networks, location data from computing devices of drivers, each of the computing devices operating a designated application associated with an application service;
    determine, based at least in part on the location data received from a computing device of a respective driver, a set of locational attributes of the respective driver;
    execute a location-based feasibility model to determine that one or more anomalous locational attributes are present in the set of locational attributes of the respective driver, wherein the one or more anomalous locational attributes correspond to the respective driver jumping ahead in a queue of drivers awaiting matches with requesting riders;

based at least in part on determining that one or more anomalous locational attributes are present, determine that the computing device of the respective driver is operating a location-spoofing application; and in response to determining that the computing device of the respective driver is operating a location-spoofing application, associate a data set with a driver profile of the respective driver.

14. The non-transitory computer readable medium of claim 13, wherein the one or more anomalous locational attributes correspond to one or more location points being added by the location-spoofing application to increase distance traveled by the respective driver.

15. The non-transitory computer readable medium of claim 13, wherein associating the data set with the driver profile of the respective driver affects a compensation of the respective driver.

16. A computer-implemented method of implementing an application service, the method being performed by one or more processors and comprising:

receiving, over one or more networks, location data from computing devices of drivers, each of the computing devices operating a designated application associated with an application service;

determining, based at least in part on the location data received from a computing device of a respective driver, a set of locational attributes of the respective driver;

executing a location-based feasibility model to determining that one or more anomalous locational attributes are present in the set of locational attributes of the respective driver;

based at least in part on determining that one or more anomalous locational attributes are present, determining that the computing device of the respective driver is operating a location-spoofing application; and in response to determining that the computing device of the respective driver is operating a location-spoofing application, associating a data set with a driver profile of the respective driver;

wherein the one or more processors further determine whether the respective driver is operating a location-spoofing application by executing a motion simulation based on the location data received from the computing device of the respective driver.

* * * * *